No. 818,136. PATENTED APR. 17, 1906.
R. A. WOODALL.
CAMERA ATTACHMENT.
APPLICATION FILED NOV. 16, 1905.
2 SHEETS—SHEET 1.
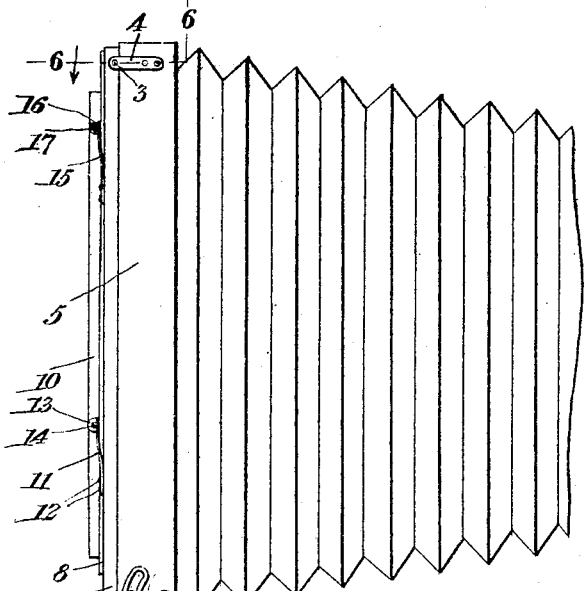
Fig. 1.
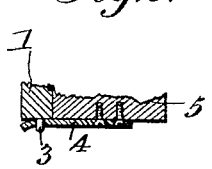
Fig. 6.
Fig. 2.
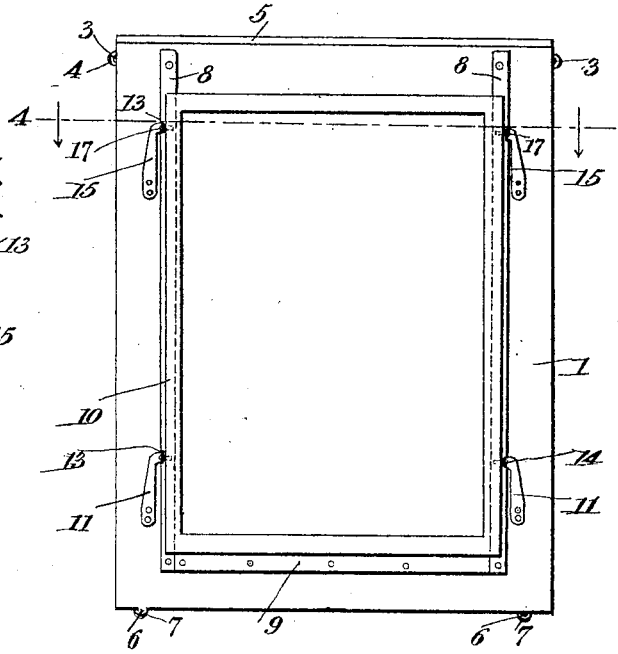
Fig. 7.
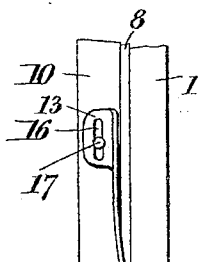
Fig. 8.
Witnesses
Russell A. Woodall
Inventor
by C. A. Snow & Co
Attorneys No. 818,136. PATENTED APR. 17, 1906.
R. A. WOODALL.
CAMERA ATTACHMENT.
APPLICATION FILED NOV. 16, 1905.

2 SHEETS—SHEET 2.

Witnesses
Russell A. Woodall Inventor
by C. A. Snow & Co
Attorneys

UNITED STATES PATENT OFFICE.

RUSSELL ALVO WOODALL, OF RICHWOOD, WEST VIRGINIA.

CAMERA ATTACHMENT.

No. 818,136. Specification of Letters Patent. Patented April 17, 1906.

Application filed November 16, 1905. Serial No. 287,713.

*To all whom it may concern:*

Be it known that I, RUSSELL ALVO WOODALL, a citizen of the United States, residing at Richwood, in the county of Nicholas and State of West Virginia, have invented a new and useful Camera Attachment, of which the following is a specification.

This invention relates to photography, and is designed to enable the use of a camera with plate-holders of different sizes within the limit of the maximum size of plate-holder for which the camera is constructed.

It is proposed to embody the invention in the nature of an attachment capable of taking the place of the usual camera-back and equipped with means for successively supporting a ground glass and a plate-holder, whereby the camera may be properly focused in the usual manner and then supplied with a plate-holder of a size differing from that for which the camera was originally made. It will here be explained that it is also proposed to put up the invention in sets according to standard sizes of plate-holders in order that any size of holder may be used upon a single camera within the limits for which it is adapted.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 3:
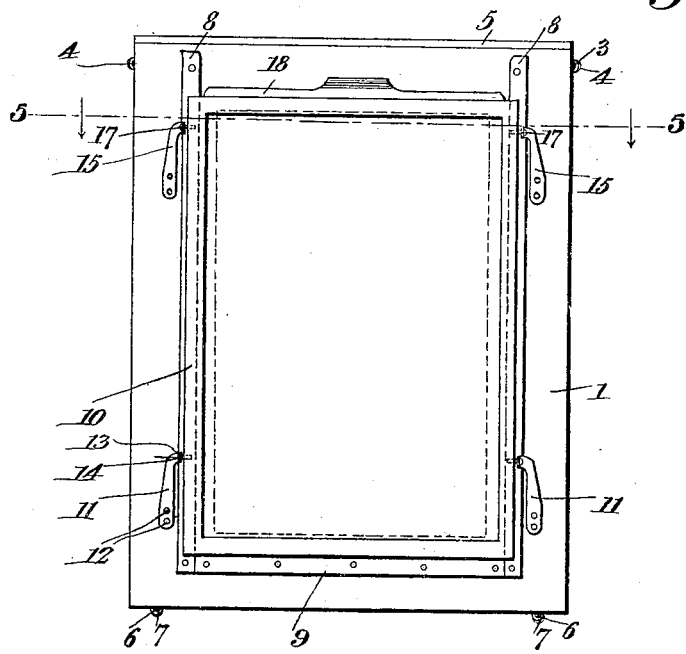
Figure 4:
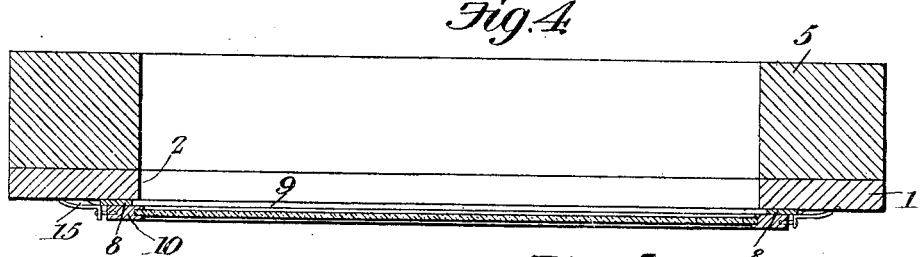
Figure 5:
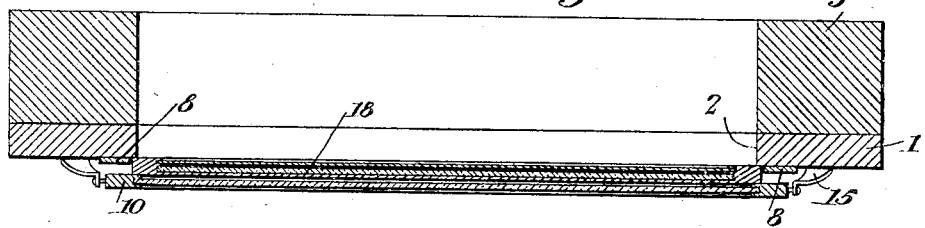

In the drawings, Figure 1 is a fragmentary side elevation of a conventional form of camera having the attachment of the present invention applied thereto. Fig. 2 is a rear face view of Fig. 1 with a ground glass in place upon the attachment. Fig. 3 is a view similar to Fig. 2, showing a plate-holder in place. Fig. 4 is an enlarged cross-sectional view on the line 4 4 of Fig. 2. Fig. 5 is a similar view on the line 5 5 of Fig. 3. Fig. 6 is a fragmentary view on the line 6 6 of Fig. 1. Fig. 7 is a detail perspective view of one of the spring-fingers for connecting the main frame and the ground-glass frame. Fig. 8 is a fragmentary detail view illustrating the slidable connection between the ground-glass frame and the main frame.

Like characters of reference designate corresponding parts in all of the figures of the drawings.

The present device includes a rectangular frame 1, having external proportions to correspond with those of some standard size of camera and provided with a rectangular opening 2, having the dimensions of some standard size of photographic plate-holder. Upon opposite edges of this frame adjacent the top thereof are pins or projections 3, which are designed to snap into openings in suitable spring-clips 4, carried by opposite sides of a camera-body 5 and projecting in rear thereof, so as to overlap the frame 1 and engage the pins 3. A similar arrangement of pins 6 and spring-clips 7 is provided at the bottom of the camera and the bottom of the frame, whereby the latter may be conveniently fitted to and removed from the camera. As clearly indicated in Fig. 6 of the drawings, it will be noted that the outer free extremity of each spring-clip is flared in order that the pins may be snapped into the openings in the clips by simply pressing the frame against the back of the camera.

Secured flat against the back of the frame 1, adjacent each upright edge of the opening 2, is a bar or strip 8, constituting a guideway, as will be hereinafter explained, there being another strip or bar 9 secured to the back of the frame below the opening therein and closing the space between the lower ends of the bars 8.

Lying flat against the bars or strips 8 is a ground-glass frame 10, which is held in place at its lower end by a pair of spring-fingers 11, which have their lower ends rigidly secured to the frame 1 by suitable fastenings 12, while their upper ends are free and provided with outwardly-directed ears 13, pierced by fastenings 14, which enter the adjacent edges of the ground-glass frame. Similar springs 15 are employed at the upper end of the frame, each of these springs having its ear provided with an upright slot 16, receiving a fastening 17, whereby the frame has a slight endwise play. It will here be explained that the ground-glass frame fits flat against the bars 8 and extends above and below the opening 2 and is yieldably supported in place, so as to permit of an ordinary plate-holder 18 being thrust downwardly between the guideways 8, the back of the frame 1, and the front of the ground-glass frame.

In practice the attachment of the present invention is applied to the back of a camera box or body in the manner hereinbefore described and as clearly indicated in Fig. 4 of the drawings. After the camera has been focused an ordinary plate-holder 18 is thrust down between the frame 1 and the ground-glass frame until it is stopped by the cross-bar 9, whereby the plate-holder is held in the proper position for an exposure, which is made in the usual manner. It will here be explained that the upper set of the springs 15 have a slidable connection with the frame 1, so as to permit of the convenient insertion and withdrawal of the plate-holder, as it is necessary to have greater play of the upper end of the ground-glass frame than at the lower end thereof.

From the foregoing description it will be understood that the device of the present invention is entirely complete in itself and capable of being applied to any ordinary camera without making any change therein beyond the application of the spring-fingers 4 and 7, and by the provision of a series of such attachments having openings corresponding in sizes to the standard sizes of plates a camera may be used with plate-holders of various sizes within the capacity of the camera.

Having thus described the invention, what is claimed is—

1. A camera attachment comprising a back having an exposure-opening, a ground-glass frame covering the opening and of less area than the back member, pairs of spring-fingers connecting each end of the ground-glass frame to the back member, each finger having one end secured to the rear face of the back member and its free end provided with an outwardly-directed ear lying against the adjacent edge of the ground-glass frame, and fastenings piercing the ears of the fingers and the ground-glass frame, one set of fingers having its ears provided with slots disposed longitudinally of the ground-glass frame and receiving the adjacent fastenings.

2. A camera attachment comprising a back having an exposure-opening, guide-bars secured to the back of the frame at opposite sides of the opening and projecting beyond one end of the opening, a cross-bar closing the space between the other ends of the guide-bars, and a ground-glass frame yieldably connected to the back and covering the exposure-opening, those ends of the guide-bars which project beyond the exposure-opening also projecting beyond the ground-glass frame.

3. A camera attachment comprising a back having an exposure-opening, guide-bars secured to the back at opposite sides of the opening and projecting beyond one end thereof, a cross-bar closing the space between the other ends of the guide-bars, a ground-glass frame applied to the guide-bars and covering the exposure-opening, those ends of the guide-bars which project beyond the opening also projecting beyond the ground-glass frame, sets of spring-fingers yieldably connecting opposite ends of the ground-glass frame to the back, each finger having one end secured to the rear face of the back at the outer side of the adjacent guide-bar with its free end provided with an outwardly-directed ear lying in substantial parallelism with the adjacent edge of the ground-glass frame, and fastenings piercing the ears and the ground-glass frame, the ears of one set of fingers having slots in which the adjacent fastenings work.

In testimony that I claim the foregoing as my own I have hereto affixed my signature in the presence of two witnesses.

RUSSELL ALVO WOODALL.

Witnesses:
F. M. WILKINSON,
ERNEST R. MILLER.